March 11, 1969     T. L. EMMER     3,432,687
PULSE-COUNTING TIME MEASUREMENT METHOD AND APPARATUS
Filed June 15, 1965     Sheet 1 of 2
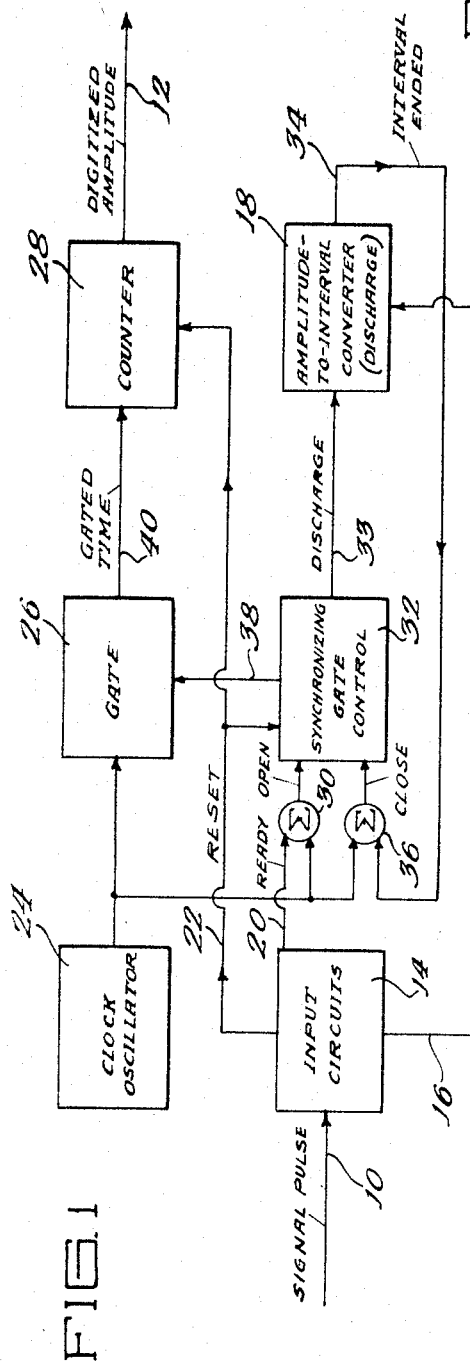
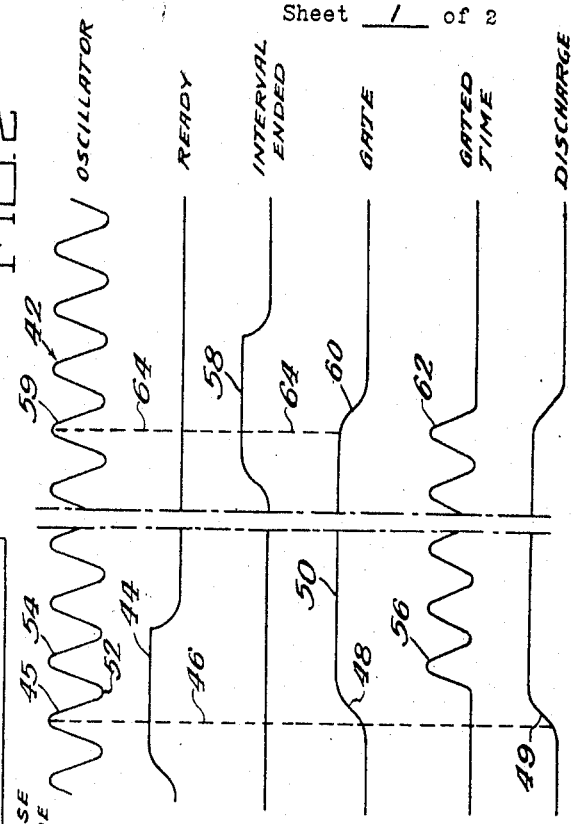
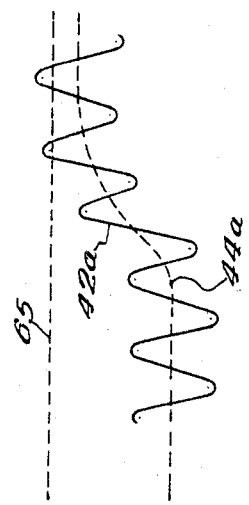
Inventor:
Thomas Lee Emmer

United States Patent Office 3,432,687
Patented Mar. 11, 1969

3,432,687
PULSE-COUNTING TIME MEASUREMENT METHOD AND APPARATUS
Thomas Lee Emmer, Oak Ridge, Tenn., assignor to Nuclear-Chicago Corporation, formerly named Searle Nuclear Corporation, Des Plaines, Ill., a corporation of Delaware
Filed June 15, 1965, Ser. No. 464,043
U.S. Cl. 307—229       9 Claims
Int. Cl. G06g 7/12, 7/16; H03k 21/00

ABSTRACT OF THE DISCLOSURE

A time-interval corresponding to the analog value of pulse amplitude is converted, in a pulse-height analyzer, to a digital value by direct counting of cycles of a clock oscillator. Adjacent-channel resolution loss due to changes in counter sensitivity with recorded count and minor circuit drifts are eliminated by varying the time of transmission of the oscillator signal only in discrete numbers of cycles, the transmission gate being both opened and closed in a portion of the cycle relatively remote from the portion of the cycle which actuates the counter. A particular circuit for operation at frequencies of the order of 50 to 100 megacycles employs tunnel diodes for the gating.

---

This invention relates to the measurement of time intervals by counting the cycles of a periodic waveform occurring during the timed interval. More particularly, the invention relates to methods and apparatus for this purpose as used in pulse-height analyzers, wherein the pulse amplitude is converted to a time-interval analog, which is then converted to a digital indication by counting of periodic pulses or waveform cycles occurring during the interval.

It has long been known that the measurement of time intervals by the general method of counting the cycles of a periodic waveform is subject to a "one count uncertainty" if the starting of the interval timed is permitted to occur at random points of the periodic cycle of the "clock" signal which is counted. Various ways of dealing with this problem have long been known. From the conceptual standpoint, the simplest of these is the straightforward one of somehow assuring that the start of the interval to be timed occurs at a fixed phase of the clock waveform, either by adjusting the initiation or phase of the clock signal, or by employing the clock signal itself to trigger the start of the timing interval. In the case of a pulse-height analyzer, the inherent nature of the operation makes the latter possible. Such analyzers normally store in a capacitor a charge proportional to the amplitude of the pulse under measurement, and count the cycles of the clock waveform occurring between the commencement of the discharge and the reaching of a fixed point of discharge, the time thus indicated by the count being an indication of the pulse amplitude. By triggering the start of the discharge in synchronism with a fixed phase of the clock signal, the ambiguity flowing from the cause just mentioned can be eliminated. However, for reasons of simplicity and economy, pulse-height analyzers of commercial manufacture have not in general employed this type of approach, but have avoided the "one-count uncertainty" in a different manner.

In most commercial analyzers prior to the present invention, the resolution between pulse-height digital "channels" has in essence been made acceptable by making each channel correspond to the occurrence of a substantial number of clock cycles, rather than a single cycle, so that the "one-count uncertainty" constitutes an uncertainty or ambiguity only at the "edge" of each band of amplitudes represented by a channel. By interposing a scaling factor of, say, eight or sixteen before counting the clock cycles, the possible ambiguity is limited to the region of the recycling of the scaling-down device interposed before the counter.

Obviously, the system just mentioned must result in large time loss in making the measurement, since for any given number of channels, the "busy time" of the digital converter is multiplied by the scaling factor. The limitation on data-handling thus imposed led to the investigation of the practical aspects of the synchronization method which culminated in the present invention.

It was found that at frequencies of the order of 50–100 megacycles, the synchronization of the start of the discharge with a fixed point of the clock cycle is not sufficient to produce the desired sharp resolution between channels. Although such synchronization produces, for any given time interval, a start and a finish completely identical and reproducible, there is introduced a new factor of uncertainty in the count which was heretofore unrecognized. This factor may be called "counting sensitivity uncertainty," to distinguish it from the "phase uncertainty" which has long been known. As will hereinafter be seen, the counting-sensitivity uncertainty actually exists at any frequency, but it is only at very high frequencies that it assumes substantial practical importance.

Counting circuits are conventionally fed with "shaped" uniform pulses, known to be more than sufficient in both amplitude and width for the requirements of the particular counter. Ordinarily, the signal to be counted (whether pulse or otherwise) is fed to a monostable trigger pair or similar triggered pulse generator, the output of which is fed to the actual counter, binary or decade. With such a system, it is immaterial whether there are changes, small or large, in the input sensitivity of the counter. Considering the shaper or monostable and its succeeding counter as a unit, the chopping off or gating of an input signal at a particular point will always either produce counting or non-counting of the cycle so peremptorily abbreviated.

At frequencies of the order of 100 megacycles, the introduction of such a "shaping" stage is impractical, if not impossible, as may be seen from either the standpoint of "speed of response" or the standpoint of the magnitude of the frequencies required to be handled by a circuit for producing such a pulse and being restored to sensitivity in time to start the next one. At such frequencies, it is accordingly impractical to use a shaping stage. Accordingly, the abbreviated last pulse must be fed to the counting circuit without first being (in essence) tested for adequacy to produce a count by a circuit of standard and constant sensitivity. The scaler or other counting circuit inherently has differing sensitivities depending upon state, with any known designs, particularly designs capable of counting at these frequencies.

Accordingly, despite the synchronization of the start of the time interval with the clock waveform, a particular cycle fragment chopped off by the ending of transmission may or may not be counted by the counter, depending upon the existing count recorded. The ambiguity thus created would exist even were the clock signal in the form of square pulses, since any counting circuit has a time-duration, as well as an amplitude, actuating level. However, the uncertainty or ambiguity is substantially multiplied where the input has relatively gradual rise and fall, as in the case of a sine loop, so that a substantial spectrum of the continuum of interval lengths will be state-dependent as regards whether they produce a count.

The present invention solves the problem of the new "uncertainty" just described by synchronizing not only the start of the transmitted portion of the clock signal but also the end of the transmitted portion of the clock signal, so that there is no variable fraction or fragment transmitted as the transmission is shut off. When the actual timing interval comes to an end, the transmission of the clock signal to the counter is nevertheless continued until the next occurrence of the standard phase of the clock signal, which is of course selected to be in a region such that the counter either will trip irrespective of its then-existing state or will not trip irrespective of its then-existing state. Obviously, the latter is preferable, and a sinusoidal clock signal should be cut off in the loop which is inactive in the counting measurement.

Because the counter will always be in the same state in receiving the first clock cycle, the phasing of the commencement of transmission is less important. However, here again, it is desirable that transmission be initiated when the signal is at a point remote from the counter-triggering portion, and the transmittal of an integral number of full cycles, commencing and ending in the region in which the counter is insensitive, is accordingly best.

It will be observed that the advantage of "stretching out" the transmission interval to an integral number of cycles has no accompanying disadvantage as regards impairment, in any way, of the accuracy. It will also be noted, upon study, that the question of whether the transmission is to be cut off at the end of a particular cycle, or at the end of the succeeding cycle, is itself one that must be determined by circuits and circuit constants. However, the function performed by the circuit making this "judgement" is more or less analogous to the passing or non-passing of a pulse to the counter by a monostable at lower frequencies, this "decision" being made by a single circuit.

In addition to the general method as just described, the invention further affords a particular form of apparatus in the form of a novel circuit having particular advantage for the method, although less advantageous forms of equipment may readily be devised. One embodiment of the novel circuit apparatus of the invention is described below, also constituting an embodiment of the method, and illustrated in the attached drawing.

In the drawing:

FIGURE 1 is a block diagram of a system for digital representation of pulse amplitudes, embodying the method of the invention;

FIGURE 2 is a more or less schematic representation of waveforms produced at various points in the system of FIGURE 1;

FIGURE 4 is an explanatory diagram of an aspect of the operation of the circuit of FIGURE 3.

Figure 3:
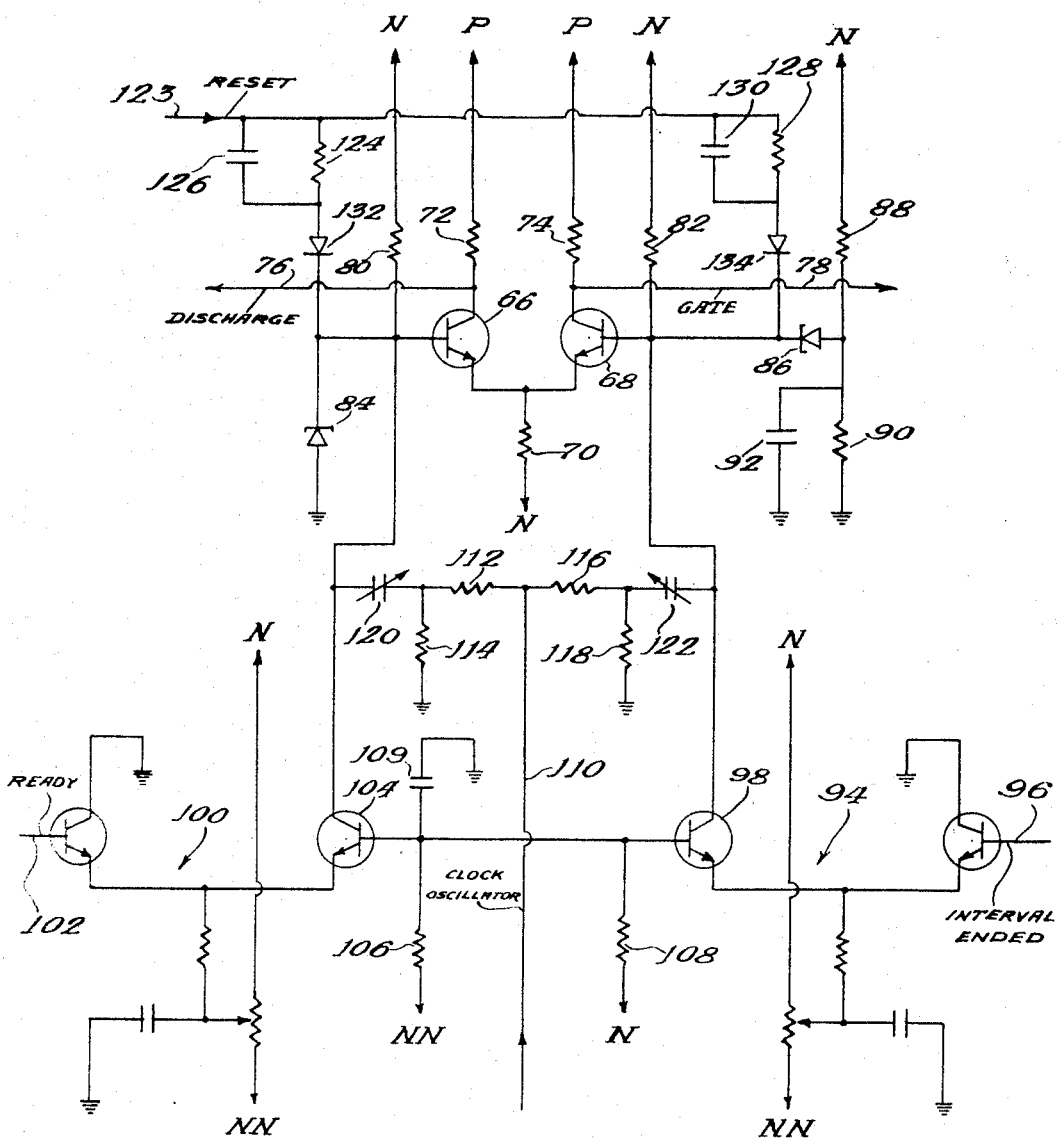
FIGURE 3 is a schematic electrical diagram of a synchronizing gate control circuit advantageously employed in the system of FIGURE 1, and constituting an embodiment of the apparatus aspect of the invention.

The system of FIGURE 1 receives at its input 10 signal pulses (for example, pulses from a radioactivity detector), and produces at its output 12 a digitized indication of the amplitude. This overall function, together with certain aspects of the operation, are generally similar to those conventional in commercial multichannel pulse-height analyzers, in which the digitized output identifies a memory address for recording the occurrence of a pulse of the indicated amplitude.

The input circuits 14 are, as regards the present invention, of the type conventionally used, forming an amplitude signal at output 16 which is transmitted to a discharge converter 18, in which the amplitude is converted to a time interval by discharging a capacitor at a fixed rate after it has been charged proportionally to the amplitude of the original signal pulse, the time of discharge to a fixed point accordingly representing the amplitude.

The input circuits 14 are also illustrated as having "ready" and "reset" outputs 20 and 22. Persons skilled in the art will readily recognize that this representation is for simplicity of illustration in the simplified diagram of the portions of the system which are well known. The control circuits employed for generation of these signals are considered, for these purposes, part of the input circuits 14. In modern analyzers, to minimize the "busy" time during which a new input pulse cannot be handled, the timing of these signals is actually determined in response to completion of an analysis in subsequent portion of the system, but this provision is omitted in the present illustration and description.

The system of FIGURE 1 employs a clock oscillator 24, the output of which is gated by a gate 26, the cycles of the oscillator occurring during the transmission interval being counted by a counter 28. The state of the counter after the transmission or gating interval constitutes the output indication of digitized amplitude at 12, employed to register in the memory of the analyzer the occurrence of a pulse of the height or amplitude corresponding to the indicated count.

The oscillator output, in addition to being fed to the gated transmission channel to the counter, is also fed to a summing circuit 30 whose output constitutes the "open" signal of a synchronizing gate control 32. To the same summing circuit is fed the "ready" signal at 20, which is of a duration longer than a cycle of the oscillator 24. The gate control 32 is tripped only in response to the peak value of the sum of these two input signals. Accordingly, the gate control operates in response to the "open" signal upon the first appearance of an oscillator peak after the "ready" pulse has been initiated. The gate control 32 has a "discharge" output 33 which controls the initiation of the operation of the converter 18, so that the discharge timing interval is initiated in fixed phase relation to the oscillator cycle.

The converter 18 has an output 34 which transmits a pulse when the constant-rate discharge has produced a reference state of charge, and this "interval ended" pulse, shaped generally similarly to the "ready" pulse, is fed to a summing circuit 36, where it is summed with the oscillator output in the manner previously described to form the "close" input to the gate control. This operates to close the gate in the manner already described for the opening of the gate. The gating output 38 of the control thus holds the gate 26 open for a time producing a gated time signal at the gate output 40 which constitutes an integral number of cycles of the oscillator.

FIGURE 2 shows, on a common time base, typical waveforms appearing at various portions of the system of FIGURE 1. The sinusoidal oscillator signal is generally designated at 42. The "ready" pulse 44 is random as regards its phasing with the oscillator signal. As shown by dotted line 46, the gate opening at 48, and the discharge initiation at 49, commence at the first appearance of a peak or maximum 45 of the oscillator signal, and are completed in an opposite-phase loop 52, the next peak 54 being the first transmitted. The gate then remains open, as shown at 50, until the "interval ended" pulse 58 prepares the circuit for the next appearance of an oscillator peak 59, at which point the gate is closed as shown at 60 and the gated time signal transmitted to the counter consists of an integral number of oscillator cycles. The first cycle 56 and the last cycle 62 are always complete in the regions to which the counter 28 responds, so that the random phase relation of the "interval ended" pulse 58 to the oscillator signal cannot reduce the last cycle to a fragment which will be counted or not counted depending upon the state (and thus sensitivity) of the counter at the time of the occurrence of this last cycle. As earlier indicated, such variation of sensitivity is inherent in practically available counting circuits capable of operation at frequencies of the order of 100 megacycles, and the present invention prevents the counting uncertainty thus otherwise caused.

The discussion thus far makes no reference to the effects of the finite response times of the circuits. Were these response times actually negligible in the operation, it would be desirable to employ for the operation of the gate control peaks of the oscillator cycle of opposite phase to those which actuate the counter, in order to keep the region of the oscillator cycle in which transmission is initiated and terminated remote from the portion which is employed to actuate the counter. However, at the high frequencies for which the present system is particularly advantageous, the response times are appreciable in relation to the oscillator period. The exact effects of response time will of course vary substantially depending upon the relation of the times involved to the cycle time of the oscillator. In the drawing of FIGURE 2, it will be seen that the waveform shapes are shown as having rise-times (and decay-times) of the order of a half cycle. Thus the initiation and termination of the transmission of the gated timing signal are delayed with respect to the oscillator peaks which provide their synchronization. With a half-cycle delay, the transmission is initiated and terminated at substantially the portion of the cycle opposite in phase to the peak which is counted by the counter. As will be recognized, the illustration in the drawing of the gated output is idealized for purposes of conceptual clarity. Because of the gradual opening of the gate at 48 and closing of the gate at 60, the first cycle 56 of the gated signal is actually preceded by a distorted signal as the gate opens, and, likewise, the last portion of the last transmitted cycle 62 is distorted by the closing of the gate. However, this distortion due to finite time of gate operation appears at a portion of the cycle which makes the counting of the last cycle 62 certain irrespective of counter state.

In the explanatory waveform diagram of FIGURE 2, the number of oscillator cycles passed by the gate is, in essence, a "rounding off" of fractional cycles to the next higher integral number, the transmittal period otherwise being equal to the time interval under measurement (neglecting the distortion just mentioned). The gate is opened at a fixed point in the first cycle to be counted and closed at the corresponding point of the cycle after the last cycle to be counted, with the delay in the latter case with respect to the end of the time interval under measurement being essentially the same as the delay in the former case with respect to the commencement of the time interval under measurement except for the completion of the terminal fractional cycle. However, this identity of delay in opening and closing need not be maintained for fully accurate measurement, if the differential between the interval under measurement and the interval of oscillator gating be held constant. This fact permits employment of the system with oscillator frequencies of period substantially shorter than the response time of opening and closing of the gates, etc., provided that suitable precision can be obtained in the exact level of output from the summing circuits 30 and 36 which trip the gate control 32.

The importance of this trigger level to operation with oscillators of very high frequency (circuit response time substantially longer than a cycle) may be seen by first considering the desirable characteristics of the triggering action with the half-cycle response times shown in FIGURE 2. As indicated in that figure by dotted lines 46 and 64, the initiation of the opening of the gate at 48 and the closing of the gate at 60 are exactly synchronized with the peak of a respective oscillator cycle 45 and 59. Superficially, this would appear to represent a trip level exactly equal to the sum of the flat-top value of the pulse 44 or 58 and the exact peak amplitude of the sinusoidal oscillator signal. Actually, however, this can never be exactly true, since the duration of this exact peak potential is zero. The actual tripping is accomplished by a combination of amplitude and duration. Accordingly, the portion of the cycle which is actually operative in producing the tripping is an area within the peak portion of the oscillator cycle, rather than a single point. As will be seen upon study, the practical necessity of providing a reasonable tolerance in the exact tip or peak area means that there will be certain times of occurrence of the "ready" and "interval ended" pulses which will produce very slightly later operation of the gate in the cycle. In FIGURE 2, both of these are shown as reaching their flat-top maximum values 44 or 58 at times substantially prior to the peaks of the pulses 45 and 59. However, where these pulses occur at times such that the maximum is reached in the region of coincidence with the peak 45 or 59, corresponding to the discrete-step transition region, a pulse which occurs just before the point of being too late to trigger the gate will produce a very slight triggering delay.

The occurrence of such a pulse as just described in the initiation or termination of a counting cycle does not produce significant alteration of the last transmitted cycle, since the small shift in exact operating time of the gate is substantially negligible for this purpose even with relatively imprecise control of trigger level. However, when the possibility of occurrence of both the "ready" and "interval ended" pulses for a single counting interval at this critical portion of the cycle is considered, it will be seen that there is created an uncertainty of a small fraction of a cycle analogous in general nature to the one-count uncertainly existing in the absence of synchronization. The more accurate the correspondence of the trip level with the exact peak of the sum signal, the smaller is the range of interval durations at channel "edges" which can be counted wrongly, and the less is the probability of the commencement of a timed interval within this range at a time producing a wrong count.

The importance of precision of the trip level is magnified when the system is used with oscillator frequencies of period shorter than the circuit response time, as is desirable where the highest frequencies made possible by the method are employed. This type of operation is shown in FIGURE 4. As there illustrated, the sinusoidal synchronizing signal 42a is additively superimposed on the initiating or terminating pulse 44a at the output of summing circuit 30 or 36 of FIGURE 1. The trigger level 65 is indicated by a dotted line indicative of the level to which a sine peak must go to trip the control. The rightmost cycle illustrated in FIGURE 4 goes beyond this level, for the practical reasons previously mentioned. It will be seen upon study that this "tolerance" creates a possible delay in exact trigger time, in terms of fraction of a cycle, which is substantially greater than at the lower frequency of FIGURE 2.

It is accordingly important to the practice of the method of the invention, at high oscillator frequencies, to provide a gate control switching circuit which requires minimum provision of excess tripping signal. In FIGURE 3, there is shown an embodiment of the apparatus aspect of the invention constituting a gate control circuit devised for this purpose, and operating in the system of FIGURE 1 with an oscillator of a frequency of 100 megacycles with a maximum uncertainty or ambiguity of substantially less than 2.5 nanoseconds (one-fourth of a channel). This accuracy is achieved with the employment of ordinary transistors having a switching or response time corresponding to a number of cycles of the oscillator, by using tunnel diodes for precision control of the trigger levels at which the gate is opened and closed.

Transistors 66 and 68 are connected with a common emitter resistor 70, each having its respective collector load resistor 72 and 74, the collector of transistor 66 being connected to the discharge output line 76 (corresponding to output 33 of FIGURE 1) and the collector of transistor 68 being connected to the gate output line 78 (corresponding to the output 38 of FIGURE 1).

Transistors 66 and 68, as here employed, together with the other transistors illustrated and described below, are NPN, and are energized from a power supply having terminals P, slightly positive with respect to ground, N, negative with respect to ground; and NN, still further negative with respect to ground. The connections of the various bias and load resistors are shown in FIGURE 3 by these designations.

The bases of the transistors 66 and 68 are connected to the N supply through resistors 80 and 82. The base of transistor 66 is also connected to the cathode of a tunnel diode 84 having its anode grounded. The base of transistor 68 is similarly connected to the cathode of a tunnel diode 86, but the anode of the latter is here connected to a point on a voltage divider consisting of resistors 88 and 90 connected between the N terminal and ground (also bypassed to ground by a capacitor 92) so as to be very slightly biased negative with respect to ground. Except for this small bias, the circuit of transistors 66 and 68 is substantially balanced throughout. Apart from the tunnel diodes, the circuit as thus far described will be recognized as that of a "differential amplifier" or differential switching circuit, in which the regenerative action of the common emitter resistor 70 switches conduction from one transistor to the other in response to alterations of base current.

A shaping or switching circuit 94, to the input 96 of which is applied the "interval ended" pulse, acts to switch conduction in a transistor 98, the collector of which is connected to the base of transistor 68. Similarly, a shaping or switching circuit 100 has an input 102 for the "ready" or initiation pulse, which switches conduction in a transistor 104 whose collector is connected to the base of the transistor 66. The bases of the transistors 98 and 104 are both connected to a point on a voltage divider 106, 108 between the N and NN potentials, with a high frequency bypass 109.

The clock oscillator input 110 is fed to two parallel voltage dividers 112, 114 and 116, 118, the midpoints of which are coupled by respective variable capacitors 120 and 122 to the bases of transistors 66 and 68.

A reset input 123, corresponding to the line 22 of FIGURE 1, is coupled to the bases of transistors 66 and 68, respectively, by RC coupling circuits 124, 126 and 128, 130 and diodes 132, 134.

The balance previously mentioned, except as regards the connections of the diodes 84 and 86, is carried out throughout the circuit, so that response times in the opening and the closing of the gate, in the manner now to be described, are essentially identical.

The circuit is prepared for a measurement by a suitable positive pulse on the reset line, setting the tunnel diodes 84 and 86 to their low voltage state. Upon withdrawal of this pulse, the switching circuit of transistors 66 and 68, due to the small negative bias (a few tenths of a volt) on the anode of tunnel diode 86 provided for this purpose, assumes the condition wherein transistor 66 is conducting and transistor 68 is nonconducting. The connections of the discharge and gate outputs 76 and 78 (not shown) are such that in this condition the discharge circuit or amplitude-to-interval converter 18 of FIGURE 1 is in the condition to store the amplitude information received on line 16 regarding an input pulse and the gate 26 is closed.

In this condition, the current supplied to both tunnel diodes 84 and 86 is substantially smaller than that required for triggering, even at the negative loops of the oscillator cycle currents. The transistors 98 and 104 are nonconducting, their base potentials being negative with respect to potential N due to the bias network consisting of resistors 106 and 108 and the "ready" and "interval ended" inputs 102 and 96 being normally at potential N.

A negative "ready" pulse at 102, signalling the commencement of measurement, turns on the current in transistor 104 and increases the current through tunnel diode 84 correspondingly, but still insufficiently to drive the tunnel diode 84 into its high voltage state were there no oscillator signal. However, on the next negative loop of the oscillator cycle (note that the polarity reversal as compared with FIGURES 2 and 4 is irrelevant) the tunnel diode is driven through its negative resistance region to the high voltage state. The current in transistor 66 is switched to transistor 68 since the base of transistor 66 is now more negative than the base of transistor 68, thus reversing the conditions of both the outputs 76 and 78 and opening the oscillator gate. The circuit remains in this condition after the "ready" pulse is removed since the current supplied through resistor 80 is sufficient to hold the tunnel diode 84 in its high voltage state. The circuit remains in this condition until a negative "interval ended" pulse causes transistor 98 to conduct, triggering tunnel diode 86 on the next negative loop of the oscillator cycle. This tunnel diode also is then held in its high voltage state after the pulse is removed, due to the current supplied through resistor 82. The slight negative voltage at the anode of tunnel diode 86 which is the sole asymmetry does not change the current in resistor 82 enough to materially affect the required triggering current; but with both tunnel diodes in their high voltage state, the base of transistor 68 is again most negative and the current in transistor 68 is switched back to transistor 66, causing the outputs 76 and 78 to return to their normal condition and closing the oscillator gate. The gate is thus closed at 78 in essentially the same phase relation to the oscillator signal as that in which it was originally opened.

The use of the tunnel diodes is highly advantageous because of the ability of these elements to trip or trigger in response to signals of extremely short duration. The tunnel diodes may be tripped by a signal of duration corresponding to the extreme maximum region of a 100-megacycle sine loop, thus minimizing the blurring of channel or count resolution of amplitudes due to the occurrence of initiating and terminating pulses at the critical phase at which error could otherwise be caused.

One suitable set of components for the particular embodiment shown in FIGURE 3, which has proved highly satisfactory is as follows: All transistors are 2N955A. The P supply is 3 volts positive, the N supply 10 volts negative, and the NN supply 20 volts negative. Resistor 70 is 1K and resistors 72 and 74 are 150 ohms. Load resistors 80 and 82 are 3.3K. Tunnel diodes 84 and 86 are TD–4. Resistors 88 and 90 are 2K and 27 ohms, respectively, and capacitor 92 is 0.1 mfd. Resistors 112, 114, 116, and 118 are each 51 ohms and capacitors 120 and 122 are 7 to 25 mmfd. Resistors 124 and 128 are 2K and capacitors 126 and 130 are 22 mmfd. Diodes 132 and 134 are 1N316. Circuit constants for the switching circuits 94 and 100 are not herein given, since the coupling function served in this portion of the circuit is well known.

Obviously, persons skilled in the art will readily apply the teachings of the invention in a variety of manners, both as regards practice of the method and the design of particular apparatus. The embodiment shown in the drawing and described above is merely illustrative. For example, although the method of the invention is particularly advantageous at frequencies of the order of 100 megacycles, where it is not practical to use a monostable or other pulse forming circuit, and the present method eliminates the problem of variation of counter sensitivity with counter state, the method is also highly useful in eliminating the effects of sensitivity changes due to other causes. As one instance, random-phase discontinuance of the signal transmission can readily produce changes of calibration due to long-term drift of the sensitivity of a pulse forming stage; with the present method, the transition period between any pair of adjacent channels (discrete time-interval bands) is dependent only on the relation between the sensitivities of the initiating and terminating switching circuits; the effects of temperature and similar drifts upon these sensitivities will in general be the same, particularly where these circuits are of balanced construction, so that day-to-day stability of calibration is greatly aided.

Accordingly, the scope of the protection to be given the invention should be determined from the definitions of the invention set forth in the appended claims, and equivalents thereof, rather than from the particular embodiment selected for illustration.

What is claimed is:

1. In the method of analog-to-digital conversion comprising transmitting a high-frequency periodic waveform for an interval responsive to the analog value to be converted and counting the number of cycles of the periodic waveform so transmitted, the improvement comprising initiating each transmittal period in response to reaching of a fixed point of the first cycle to be counted and terminating each transmittal period in response to reaching of the corresponding point of the cycle after the last cycle to be counted to vary the transmittal period only in discrete numbers of full cycles and minimize lost-count uncertainty.

2. The method of claim 1 wherein the cycles are counted by counting the occurrences of a peak portion thereof, said fixed point being substantially displaced from this peak portion.

3. The method of claim 2 wherein the periodic waveform is substantially sinusoidal, the peak portion being one loop of each cycle and the fixed point being in the opposite loop.

4. In the method of analog-to-digital conversion of the amplitude of pulses comprising transmitting a periodic waveform for an interval to the pulse amplitude and counting the number cycles of the periodic waveform so transmitted, the pulses occurring in random relation to the waveform cycle, the improvement comprising:
 (a) generating an initiating signal occurring in random phase relation to the periodic waveform in response to the occurrence of the pulse,
 (b) initiating the transmittal interval in synchronism with a fixed point of a periodic waveform cycle occurring after such initiating signal,
 (c) generating a terminating signal occurring at a point of the waveform cycle responsive to exact amplitude of the pulse,
 (d) and terminating the transmittal interval in synchronism with the same fixed point of a periodic waveform cycle occurring after such terminating signal.

5. In the method of producing a digital indication of the time interval between a starting event and a terminating events comprising producing a periodic waveform, transmitting the periodic waveform for an interval initiated and terminated in response to the respective events, and counting the occurrences of one portion of the successive cycles of the periodic waveform so transmitted, the initiating event occurring at a fixed point in the waveform cycle and the terminating event occurring in random relation to the waveform cycle, the improvement comprising terminating the transmittal interval upon an occurrence after the terminating events of a fixed point in the waveform cycle, both said fixed points being substantially removed from the portion of the cycle of which the occurrences are so counted.

6. The improved method of claim 5 wherein the waveform is substantially sinusoidal, both said fixed points being substantially opposite in phase to the counted portion.

7. An analog-to-digital converter having heans for converting an analog value to a time interval, an oscillator, and means for gating the tranmission of the output of the oscillator for a time responsive to the converting means, the gating means comprising:
 (a) a pair of tunnel diodes,
 (b) means responsive to the triggering of one of the tunnel diodes from its low-voltage to its high-voltage state to initiate the interval and the transmission and means responsive to the triggering of the other of the tunnel diodes from its low-voltage to its high-voltage state to terminate the transmission,
 (c) means for feeding the oscillator output to both tunnel diodes,
 (d) means for feeding an initiating signal to the first tunnel diode and means responsive to the converting means for feeding a terminating signal to the second tunnel diode, both said signals being of duration longer than the cycle of the oscillator,
 (e) each tunnel diode being triggered only by the sum of the respective signal and a peak of the oscillator output,
so that the opening and closing of the gating means are in fixed phase relation to the oscillator substantially independently of the exact times of occurrence of said signals, and the gating period is varied in discrete steps corresponding to full cycles of the oscillator.

8. The analog-to-digital converter of claim 7 wherein the oscillator output is generally sinusoidal.

9. The analog-to-digital converter of claim 8 wherein thet initiating signal and the terminating signal have constant-amplitude peak portions longer than the cycle of the oscillator, each tunnel diode being triggered only by the sum of the peak portion of the respective signal and the peak portion of the oscillator output.

References Cited

UNITED STATES PATENTS

| 3,229,272 | 1/1966 | Cohen et al. | 340—347 |
|---|---|---|---|
| 3,246,314 | 4/1966 | Kaenel | 340—347 |
| 3,276,012 | 9/1966 | Secretan | 340—347 |
| 3,294,958 | 12/1966 | Du Vall | 340—347 |

JOHN S. HEYMAN, *Primary Examiner.*

U.S. Cl. X.R.

307—220, 322; 324—68; 340—347

PO-1050
(5/69)

UNITED STATES PATENT OFFICE
CERTIFICATE OF CORRECTION

Patent No. 3,432,687      Dated March 11, 1969

Inventor(s)     T. L. Emmer

It is certified that error appears in the above-identified patent and that said Letters Patent are hereby corrected as shown below:

Col. 9, line 27: Before "to" there should be inserted --responsive--

Col. 9, line 46: "events" should be --event--

Col. 9, line 55: "events" should be --event--

Col. 10, line 8: "heans" should be --means--

Col. 10, line 28: After "peak" there should be inserted --value--

Col. 10, line 38: "thet" should be --the--

SIGNED AND
SEALED
JAN 27 1970

(SEAL)
Attest:

Edward M. Fletcher, Jr.
Attesting Officer

WILLIAM E. SCHUYLER, JR.
Commissioner of Patents